US009302185B2

(12) United States Patent
Dawson et al.

(10) Patent No.: US 9,302,185 B2
(45) Date of Patent: Apr. 5, 2016

(54) DECISION STREAMS FOR SYNCHRONIZING VISUAL SCRIPT LANGUAGE PROCESSING BETWEEN NETWORKED COMPUTERS

(75) Inventors: Matthew Dawson, Highland, UT (US); Phil Knight, Stansbury Park, UT (US); Kirk Baum, American Fork, UT (US)

(73) Assignee: Disney Enterprises, Inc., Burbank, CA (US)

( * ) Notice: Subject to any disclaimer, the term of this patent is extended or adjusted under 35 U.S.C. 154(b) by 190 days.

(21) Appl. No.: 13/523,084

(22) Filed: Jun. 14, 2012

(65) Prior Publication Data

US 2013/0339421 A1 Dec. 19, 2013

(51) Int. Cl.
| | | |
|---|---|---|
| *G06F 15/16* | (2006.01) | |
| *A63F 13/47* | (2014.01) | |
| *H04N 21/478* | (2011.01) | |
| *A63F 13/60* | (2014.01) | |
| *A63F 13/358* | (2014.01) | |

(52) U.S. Cl.
CPC .............. *A63F 13/47* (2014.09); *A63F 13/358* (2014.09); *A63F 13/60* (2014.09); *H04N 21/4781* (2013.01); *A63F 2300/5533* (2013.01); *A63F 2300/5573* (2013.01)

(58) Field of Classification Search
None
See application file for complete search history.

(56) References Cited

U.S. PATENT DOCUMENTS

| | | | | |
|---|---|---|---|---|
| 5,774,668 A * | 6/1998 | Choquier | ................ | G06F 9/505 370/480 |
| 5,838,909 A * | 11/1998 | Roy et al. | ...................... | 709/209 |
| 5,898,834 A * | 4/1999 | Sharpe | .................... | H04L 29/06 709/201 |
| 6,415,317 B1 * | 7/2002 | Yelon et al. | .................... | 709/205 |
| 6,742,028 B1 * | 5/2004 | Wang | ............... | G06F 17/30209 707/999.01 |
| 6,763,377 B1 * | 7/2004 | Belknap | ............ | H04L 29/06027 709/223 |
| 6,957,266 B2 * | 10/2005 | Evans | ................ | H04N 21/2368 348/500 |
| 7,174,361 B1 * | 2/2007 | Paas | .............................. | 709/203 |
| 7,363,431 B1 * | 4/2008 | Niver | .................. | H04L 67/1095 707/999.201 |
| 7,661,109 B2 * | 2/2010 | Lindhorst et al. | ............. | 719/316 |
| 8,244,804 B1 * | 8/2012 | Casselman | .................... | 709/203 |
| 8,449,397 B2 * | 5/2013 | Martone | ........................ | 463/42 |
| 2002/0160833 A1 * | 10/2002 | Lloyd | ..................... | A63F 13/10 463/29 |
| 2005/0149481 A1 * | 7/2005 | Hesselink et al. | ................ | 707/1 |
| 2006/0235547 A1 * | 10/2006 | Hindi | ..................... | G03G 15/50 700/2 |

(Continued)

OTHER PUBLICATIONS

Bishop, Lars, et al. "Designing a PC game engine." Computer Graphics and Applications, IEEE 18.1 (1998): 46-53.*

(Continued)

*Primary Examiner* — Scott B Christensen
*Assistant Examiner* — Lam Do
(74) *Attorney, Agent, or Firm* — Farjami & Farjami LLP

(57) ABSTRACT

A method is provided for decision streams for synchronizing visual script language processing between networked computers. A master computing device may receive a remote kickoff stream indicating master nodes to be processed on a master graph, create a master decision stream using the remote kickoff stream, process master nodes of the master graph to populate the master decision stream with states and actions during the processing, and distribute the master decision stream to clients for synchronization of private graphs. The master and private graphs may be copies of the same visual script for implementing game logic, which may be created and edited using a graphical user interface (GUI). Nodes of the graphs can be marked as master, requiring global synchronization, or private, allowing immediate local processing with reduced latency. Thus, online game designers are empowered to balance the competing concerns of state synchronization and latency.

20 Claims, 6 Drawing Sheets

(56) References Cited

U.S. PATENT DOCUMENTS

| | | | |
|---|---|---|---|
| 2007/0022122 A1* | 1/2007 | Bahar | G06F 9/5011 |
| 2009/0254843 A1* | 10/2009 | Van Wie | H04L 12/1822 715/757 |
| 2012/0016904 A1* | 1/2012 | Mahajan | G06F 17/30575 707/769 |
| 2012/0166516 A1* | 6/2012 | Simmons et al. | 709/202 |
| 2012/0233418 A1* | 9/2012 | Barton | G06F 17/30575 711/162 |
| 2012/0330887 A1* | 12/2012 | Young et al. | 707/610 |
| 2013/0059664 A1* | 3/2013 | Behmaram-Mosavat | A63F 13/12 463/42 |

OTHER PUBLICATIONS

White, Walker et al. "Better scripts, better games." Communications of the ACM 52.3 (2009): 42-47.*

Ploss, Alexander, et al. "From a single-to multi-server online game: a Quake 3 case study using RTF." Proceedings of the 2008 International Conference on Advances in Computer Entertainment Technology. ACM, 2008.*

J. M. P. V. Waveren, "The Quake III Arena Bot," Master's thesis, University of Technology Delrt, Netherlands, 2001.*

Perez, Diego, et al. "Evolving behavior trees for the Mario AI competition using grammatical evolution." Applications of Evolutionary Computation. Springer Berlin Heidelberg, 2011. 123-132.*

Caltagirone, Sergio, et al. "Architecture for a massively multiplayer online role playing game engine." Journal of Computing Sciences in Colleges 18(2) (2002): 105-116.*

Hampel, Thorsten, Thomas Bopp, and Robert Hinn. "A peer-to-peer architecture for massive multiplayer online games." Proceedings of 5th ACM SIGCOMM workshop on Network and system support for games. ACM, 2006.*

Cronin, Eric, et al. "An efficient synchronization mechanism for mirrored game architectures." Multimedia Tools and Applications 23.1 (2004): 7-30.*

Gill, Sunbir, "Visual Finite State Machine AI Systems." Gamasutra (Nov. 2004), http://www.gamasutra.com/features/20041118/gill-01.shtml.*

Kienzle, Jorg, Alexandre Denault, and Hans Vangheluwe. "Model-Based Design of Computer-Controlled Game Character Behavior." Model Driven Engineering Languages and Systems. Springer Berlin Heidelburg, 2007. 650-665.*

Lewis, Michael, and Jeffery Jacobson. "Game Engines." Communications of the ACM 45.1 (2002): 27.*

Claypool, Mark, and Kajal Claypool. "Latency and player actions in online games." Communications of the ACM 49.11 (2006): 40-45.*

Grabska-Gradzińska, Iwona, et al. "Towards a Graph-Based Model of Computer Games." (2012).*

Mens, Tom, Gabriele Taentzer, and Olga Runge. "Analysing refactoring dependencies using graph transformation." Software & Systems Modeling 6.3 (2007): 269-285.*

* cited by examiner

| Stream Entry | Graph Source Node | Graph ID | Data |
|---|---|---|---|
| 1 | Munition Impact 254 | ID1 | Shooter, Weapon ID, Surface Material, Intersection, Energy, Damage, Damage Type, Hit Reaction |
| 2 | Gate 256 | ID2 | State=Open |
| 3 | Exploder 252 | ID3 | State=Exploded |

| Stream Entry | Graph Source Node | Graph ID | Data |
|---|---|---|---|
| 1 | Munition Impact 254 | ID1 | Shooter, Weapon ID, Surface Material, Intersection, Energy, Damage, Damage Type, Hit Reaction |
| 2 | Exploder 252 | ID2 | State=Exploded |

236d
236e

234b

| Stream Entry | Graph Source Node | Graph ID | Data |
|---|---|---|---|
| 1 | Master Net Sync 268 | ID3 | (Optional input parameters) |
| 2 | Gate 256 | ID4 | State=Open |
| 3 | Report Stat 260 | ID5 | -- |

236f
236g
236h

DECISION STREAMS FOR SYNCHRONIZING VISUAL SCRIPT LANGUAGE PROCESSING BETWEEN NETWORKED COMPUTERS

BACKGROUND

For certain applications, it is desirable to provide low latency synchronization of logic states between networked computers. This is especially important for real-time applications such as online video games, where near instant feedback is required for convincing interactivity. Additionally, to provide design flexibility and to modularize engine programming, it is desirable to control game logic using general-purpose scripting languages, especially visual scripting languages that are amenable to creation by graphical user interfaces (GUIs).

On the other hand, to keep logic states consistent between networked computers, it is also desirable to have a single arbiter for logic processing. For example, a networked multi-player video game may need to determine a specific player to receive credit for defeating an enemy, or the video game may need to determine whether certain group-based or environmental prerequisites are satisfied before triggering an event. Conventionally, each networked computer may offload such game logic script processing to a centralized game server. However, due to the latency introduced by round trip network communications with the centralized game server, the goal of low latency state synchronization becomes more difficult to achieve.

SUMMARY

The present disclosure is directed to decision streams for synchronizing visual script language processing between networked computers, substantially as shown in and/or described in connection with at least one of the figures, as set forth more completely in the claims.

BRIEF DESCRIPTION OF THE DRAWINGS

FIG. 2D presents an exemplary diagram of decision streams for synchronizing the state graph of FIG. 2C between networked computers;

DETAILED DESCRIPTION

Figure 1:
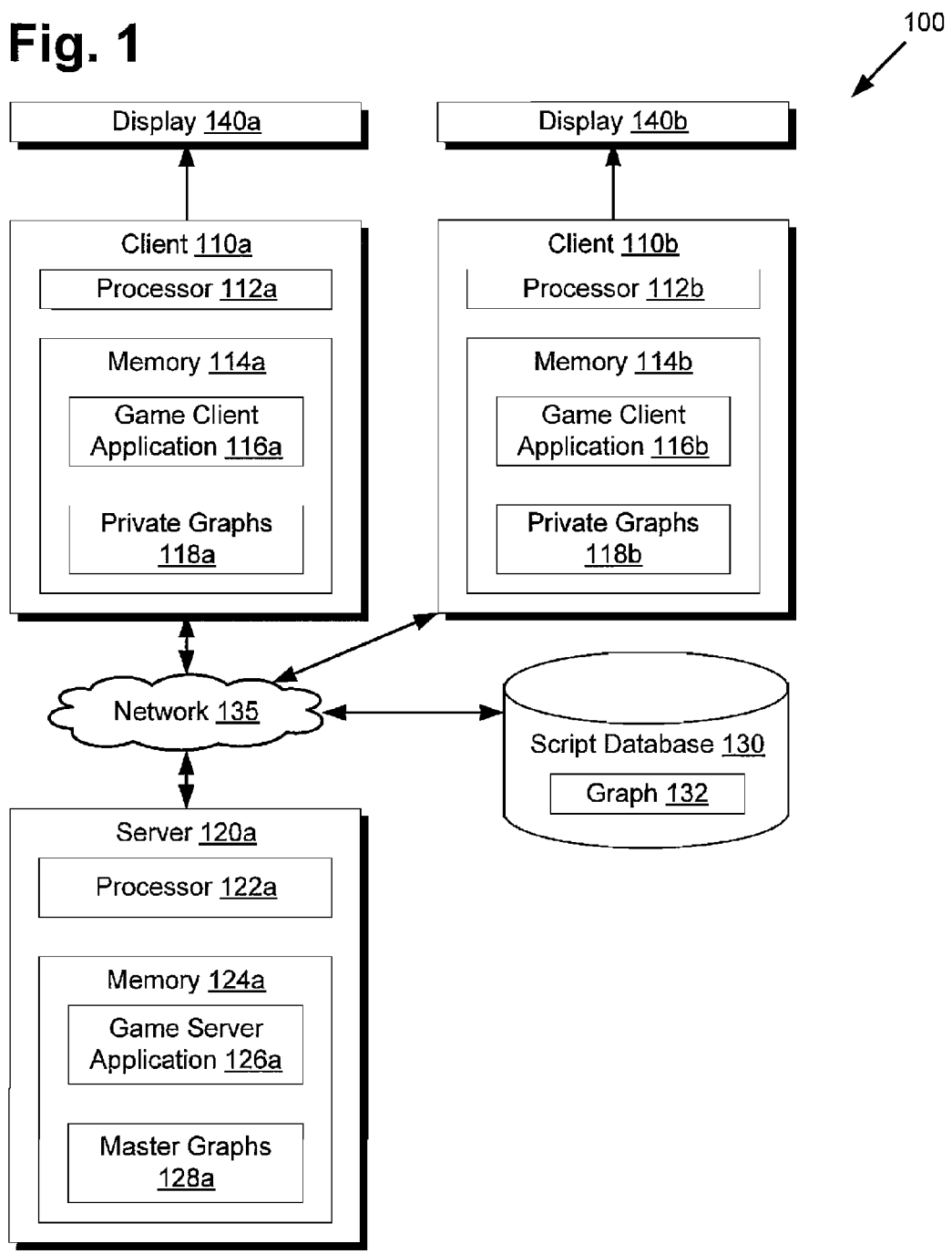
FIG. 1 presents an exemplary diagram of a system for providing decision streams for synchronizing visual script language processing between networked computers.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents an exemplary diagram of a system for providing decision streams for synchronizing visual script language processing between networked computers. Diagram 100 of FIG. 1 includes client 110a, client 110b, server 120a, script database 130, network 135, display 140a, and display 140b. Client 110a includes processor 112a and memory 114a. Memory 114a includes game client application 116a and private graphs 118a. Client 110b includes processor 112b and memory 114b. Memory 114b includes game client application 116b and private graphs 118b. Server 120a includes processor 122a and memory 124a. Memory 124a includes game server application 126a and master graphs 128a. Script database 130 includes graph 132.

Diagram 100 illustrates a simplified topology for an exemplary multi-player online videogame. Accordingly, only two clients 110a-110b and one server 120a are shown. However, alternative implementations may support a much larger number of clients and may provide multiple servers for load balancing and/or reduced latency. Clients 110a-110b and server 120a may be any computing device, such as a desktop computer, laptop computer, tablet, game console, or another device. Network 135 may be a public network such as the Internet, and may provide data links between clients 110a-110b, server 120a, and script database 130.

Furthermore, while a conventional server and client model is shown in diagram 100 of FIG. 1, a peer-to-peer network may also be implemented, in which case all computing devices may be considered both clients and servers, as appropriate. Devices may form local peer-to-peer networks and distribute workloads based on user proximity within a virtual environment, with at least one computing device being dynamically designated as a "Master" computing device, corresponding to server 120a, for each peer-to-peer network. Devices may also participate in multiple peer-to-peer networks concurrently. For example, a device with a particularly high-speed and low-latency network connection may be preferably designated as a "Master" device for servicing multiple geographic areas of the virtual environment. The "Master" device handles the receiving and distributing of decision streams from other devices, as discussed in further detail below.

Script database 130 may be populated by several state graphs for implementing game logic, including graph 132 as shown. The graphs of script database 130 may be generated and edited using a visual script language creation tool, allowing game designers to script game logic using a graphical user interface (GUI). Alternatively, the graphs of script database 130 may also be provided using conventional text edited scripts.

In one particular arrangement of script database 130, graphs may be sorted and divided according to associated locations within a virtual environment. Thus, clients 110a-110b may retrieve the required graphs from script database 130 according to the in-game location of their particular character or avatar within their respective game client applications 116a-116b. For example, when game client applications 116a and 116b include a respective avatar in a shared cave location, and when graph 132 is associated with the same cave location, a copy of graph 132 may be retrieved and stored within private graphs 118a and 118b.

Similarly, each online server may be assigned one or more locations to host, which may change dynamically to implement load balancing. Thus, server 120a may retrieve the required graphs from script database 130 based on the locations to be hosted by game server application 126a. For example, when server 120a is assigned to host the cave location, a copy of graph 132 may be retrieved and stored within master graphs 128a. If a large number of players enter the cave location, a new server may be assigned to also host the cave location. On the other hand, if a large number of players move to a different location, then server 120a may be reassigned to host the different location.

In a multi-player online game, it is desirable to maintain a high level of state synchronization between clients 110a-110b so that all users can experience a coherent virtual environment, which is visually depicted on displays 140a-140b. To provide this level of synchronization, clients 110a-110b may send requests to server 120a to finally arbitrate any game logic affecting multiple clients. Thus, game client applications 116a-116b may send requests to game server application 126a for evaluating multi-player game logic using master graphs 128a. However, since communications over network 135 may be subject to some unavoidable latency, the total time for receiving a response from server 120a may be significant, resulting in undesirable lag between user actions and the expected responses on displays 140a-140b.

Figure 2A:
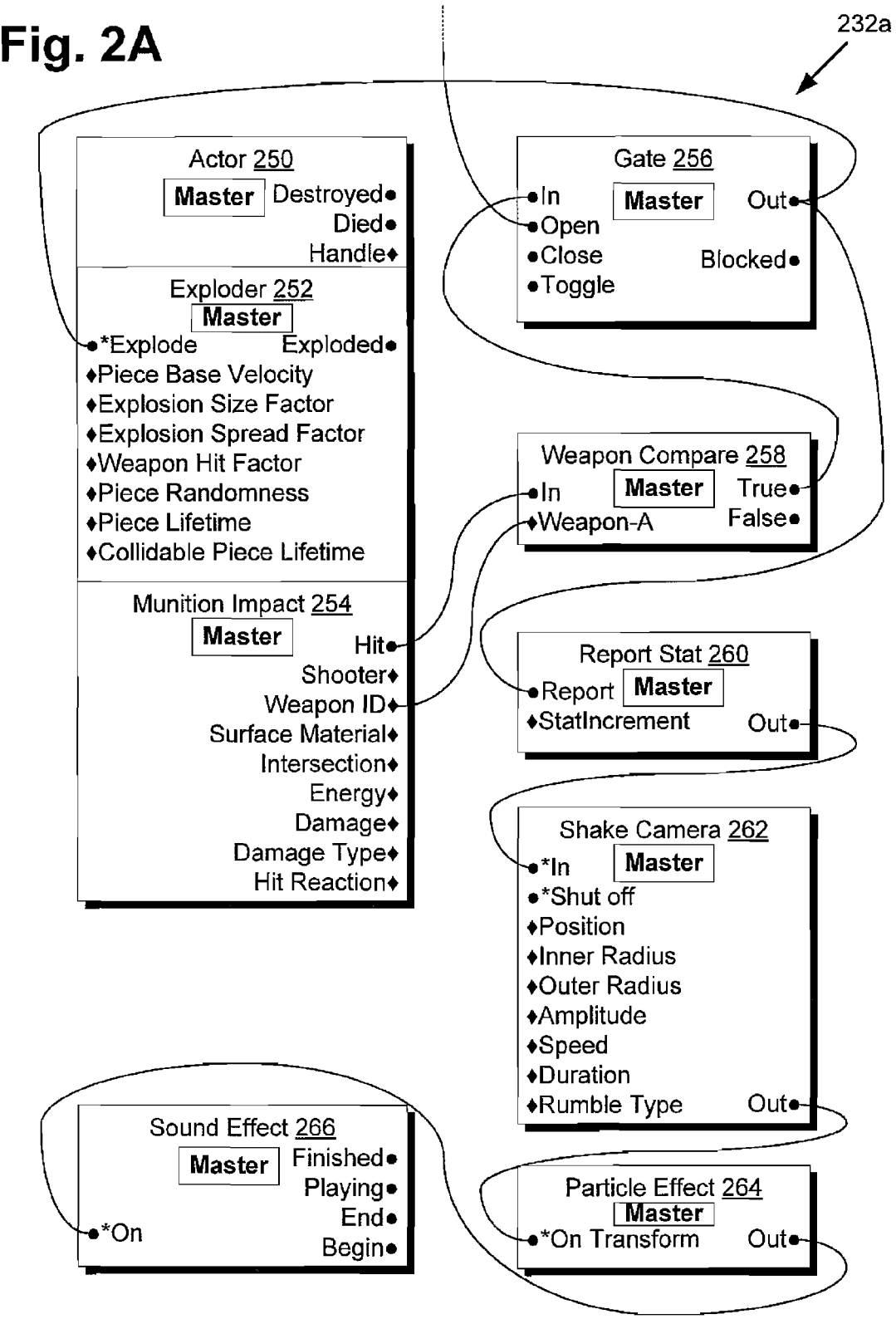
FIG. 2A presents an exemplary diagram of a state graph expressed by a visual script language.

FIG. 2A presents an exemplary diagram of a state graph expressed by a visual script language. Graph 232a of FIG. 2A includes several nodes including actor 250, exploder 252, munition impact 254, gate 256, weapon compare 258, report stat 260, shake camera 262, particle effect 264, and sound effect 266. With respect to FIG. 2A, graph 232a may correspond to graph 132 in FIG. 1.

As shown in FIG. 2A, graph 232a is organized in a visual layout with several interconnected nodes for evaluating game logic. Nodes may process one or more input functions, which are labeled with circles aligned to the left side of each node. Certain nodes, such as munition impact 254, may be considered a "kickoff node" that can execute an anonymous function without being triggered by an external input. After function execution, nodes may also fire one or more output impulses, which are labeled with circles aligned to the right side of each node. These output impulses may surge through graph 232a to trigger input functions of downstream nodes, and may be connected to multiple downstream nodes, as shown in gate 256. Further, each node may contain one or more parameters, indicated by diamonds, which may be passed between nodes. The specific function logic of each node is omitted for simplicity but may be inferred from the node title and the inputs and outputs shown.

Graph 232a may represent a game scenario where actor 250 is exploded by a munition impact 254 only when gate 256 is set to the "Open" state, which is controlled by some external logic, not shown in FIG. 2A. For example, a player character controlled by client 110a may attempt to attack actor 250, which triggers the munition impact 254 kick-off node for client 110a. At the time of impact, client 110a may populate all the required parameters in munition impact 254 and send the "Hit" output impulse to the "In" input function of weapon compare 258, with "Weapon ID" passed as a parameter.

Moving to the next node, weapon compare 258 executes logic for the "In" input function, comparing "Weapon ID" with "Weapon-A", which may be set to a specific weapon ID, for example a shoulder charge. If the comparison is true, the "True" output impulse is fired as shown; otherwise, the "False" output impulse is fired.

Next, gate 256 executes logic for the "In" input function. As shown in graph 232a, the "Open" input function is triggered by another node that is not shown. After executing the "Open" input function, gate 256 may set an internal state indicating an open status. The "In" input function may confirm that the internal state is set to "open" before sending an "Out" output impulse. Otherwise, if the internal state is set to "closed", the "Blocked" output impulse may be fired instead. As shown in FIG. 2A, the "Out" output impulse is connected to multiple nodes, or exploder 252 and report stat 260. When multiple output impulses are emitted and the branches are independent of each other, the downstream node branches may be processed serially in any order or alternatively in parallel. Otherwise, the branches may be traversed serially according to data dependencies.

Assuming exploder 252 is the first node to be processed, the "Explode" input function is triggered using various parameters, as listed. Since no additional output impulses are fired at exploder 252, processing may proceed to nodes of the next branch, beginning with report stat 260.

At report stat 260, the "Report" input function may record the details of munition impact 254, for example by writing a record in a database. The database may then be consulted by the videogame to determine whether enough damage has been inflicted on actor 250 to trigger an output impulse, and also to determine the distribution of experience points, money, and other rewards. After the recording, the "Out" output impulse is fired, triggering the "In" input function of shake camera 262.

Shake camera 262 may then provide a camera shaking effect to the view of display 140a and 140b in FIG. 1 according to the various parameters as shown. Shake camera 262 may also fire the "Out" output impulse to trigger the "On Transform" input function of particle effect 264, which may apply particle effects to the explosion in progress triggered by exploder 252. The "Out" impulse of particle effect 264 in turn triggers the "On" input function of sound effect 266, which may play an explosion sound effect on display 140a of client 110a. At this point, since sound effect 266 has no further output impulses, processing of the second and final branch ends. If additional effects and processing are required, they may be triggered from the "Begin" output impulse of sound effect 266.

Referring back to FIG. 1, as previously discussed, a copy of graph 132 corresponding to graph 232a of FIG. 2A may be copied and locally stored in private graphs 118a, private graphs 118b, and master graphs 128a. Thus, client 110a and client 110b may have independent graph states that can differ from each other as they are privately processed, leading to inconsistent game states between clients. To keep graphs synchronized, all state processing might be deferred to master graphs 128a on server 120a. However, since each client must wait for a response from server 120a over network 135, large latency penalties may result, reducing game responsiveness and detracting from gameplay.

Figure 2B:
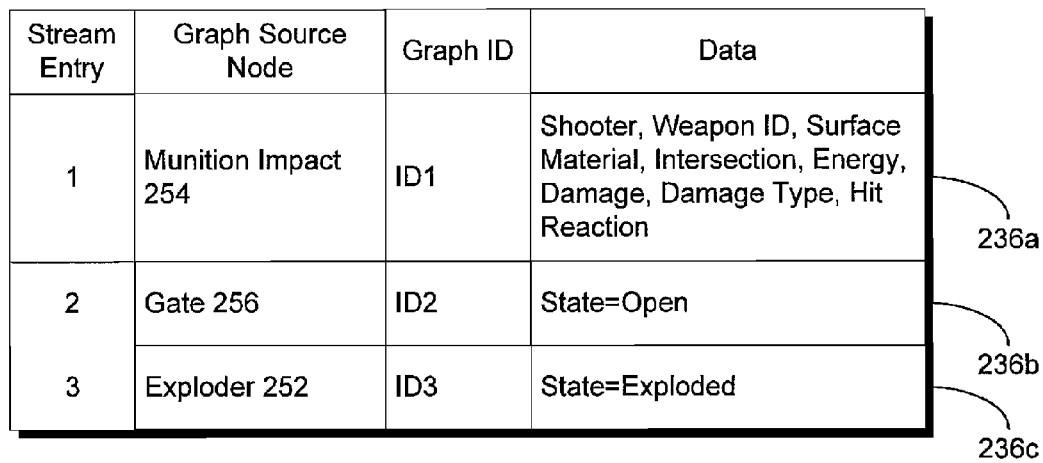
FIG. 2B presents an exemplary diagram of a decision stream for synchronizing the state graph of FIG. 2A between networked computers.

Accordingly, FIG. 2B presents an exemplary diagram of a decision stream for synchronizing the state graph of FIG. 2A between networked computers. Decision stream 234 includes record 236a, record 236b, and record 236c. Each of records 236a-236c includes a stream entry field, a graph source node field, a graph ID field, and a data field.

Decision stream 234 is a record of states and actions taken based on those states. By creating and distributing decision stream 234, other networked computers can follow a single authoritative course of action to remain synchronized with each other. The creation of a decision stream begins when a kick-off node is processed. By default, a kick-off node may be marked as a "Master" node requiring global synchronization. In this case, if a kick-off node is processed at a local client, the local client only generates a Kickoff Stream that contains data regarding the specific event at the kick-off node, which may also be considered as a special case single-entry decision stream. Output impulses and surges that would be normally fired are not fired; instead, the Kickoff Stream is passed as a Remote Kickoff Stream to a Graph Master, for example server 120*a*, which can then handle the creation of the actual decision stream 234. A Kickoff callback function is also registered for each client to handle the processing of decision stream 234 when eventually received from network 135.

Once server 120*a* receives the Remote Kickoff Stream from client 110*a*, server 120*a* can begin the actual process of generating decision stream 234. First, as shown in record 236*a*, the details from the Remote Kickoff Stream are simply copied over to decision stream 234. The "stream entry" field enumerates the record and may indicate the desired order of processing. The "graph source node" field references the munition impact 254 node from graph 132, corresponding to graph 232*a*. The "graph ID" field "ID1" may more specifically refer to the particular node within master graphs 128*a*. Note that while at a minimum, only the first record needs to have a graph ID as the graph ID of the remaining records may be traced and derived from the first record, for ease of debugging and tracing it may be preferable to record the graph ID for each record in decision stream 234. The "data" field contains all the parameters in munition impact 254.

After writing record 236*a*, server 120*a* may continue processing graph 232*a* within master graphs 128*a*, adding new records to decision stream 234 as necessary. Thus, the processing of graph 232*a* continues as the parameters from munition impact 254 are examined and a "Hit" output impulse is accordingly sent to weapon compare 258. Since the processing of weapon compare 258 is entirely dependent on inputs and does not use any internal states, no records need to be written to decision stream 234 regarding weapon compare 258.

Continuing to gate 256, the processing of gate 256 on the other hand requires a determination of the internal state of the gate, or whether it is open or closed. Moreover, the state of gate 256 may be independently affected by various clients. Accordingly, record 236*b* is written to decision stream 234 as shown, with the state of gate 256 recorded as open. Since the gate state is open, a output impulse is sent to exploder 252 and report stat 260. For exploder 252, record 236*c* is written to decision stream 234 as shown, reflecting the state of exploder 252. This is necessary since the explosion state may differ between machines due to latency.

On the other hand, for the node branch starting with report stat 260, no further records are required as none of the remaining nodes require synchronization. For example, report stat 260 only requires writing a single record in a database without any synchronization, and shake camera 262, particle effect 264, and sound effect 266 all relate to audiovisual effects that can be locally processed by each client without synchronization. Optionally, a "private net sync" node may be explicitly inserted after report stat 260 to indicate that the remaining nodes are to be processed locally on private graphs. Accordingly, after reaching sound effect 266 or the private net sync node, decision stream 234 may be finalized and sent back via network 135 to all clients participating in the same game, including client 110*a* and client 110*b*.

As discussed previously, each client may have a callback function to handle the processing of decision stream 234 after being received from network 135. The callback function will mirror the processing of the relevant graph in the locally stored graph, or a graph within private graphs 118*a* and 118*b* for clients 110*a* and 110*b* respectively. If node states are inconsistent between the local graph and decision stream 234, the recorded states in decision stream 234 override the local graph, thereby enforcing synchronization.

While graph 232*a* may be synchronized using decision stream 234, the latency result is suboptimal as much of the same waiting time for server synchronization still occurs when the kick-off node munition impact 254 is set to global synchronization or "master" as per default settings for graph 232*a*. While this default setting allows game designers to create logic graphs without having to consider synchronization, manual or automated assignment of synchronization settings to nodes also enables game designers to greatly optimize game logic for minimal latency. Individual nodes may be explicitly set to "private", which do not require synchronization, or "master", which require global synchronization. Modifier nodes, such as master net sync or private net sync nodes, may also explicitly set the synchronization setting for all downstream nodes. By identifying certain nodes as private, these nodes can be processed locally and immediately at each client for reduced latency.

Figure 2C:
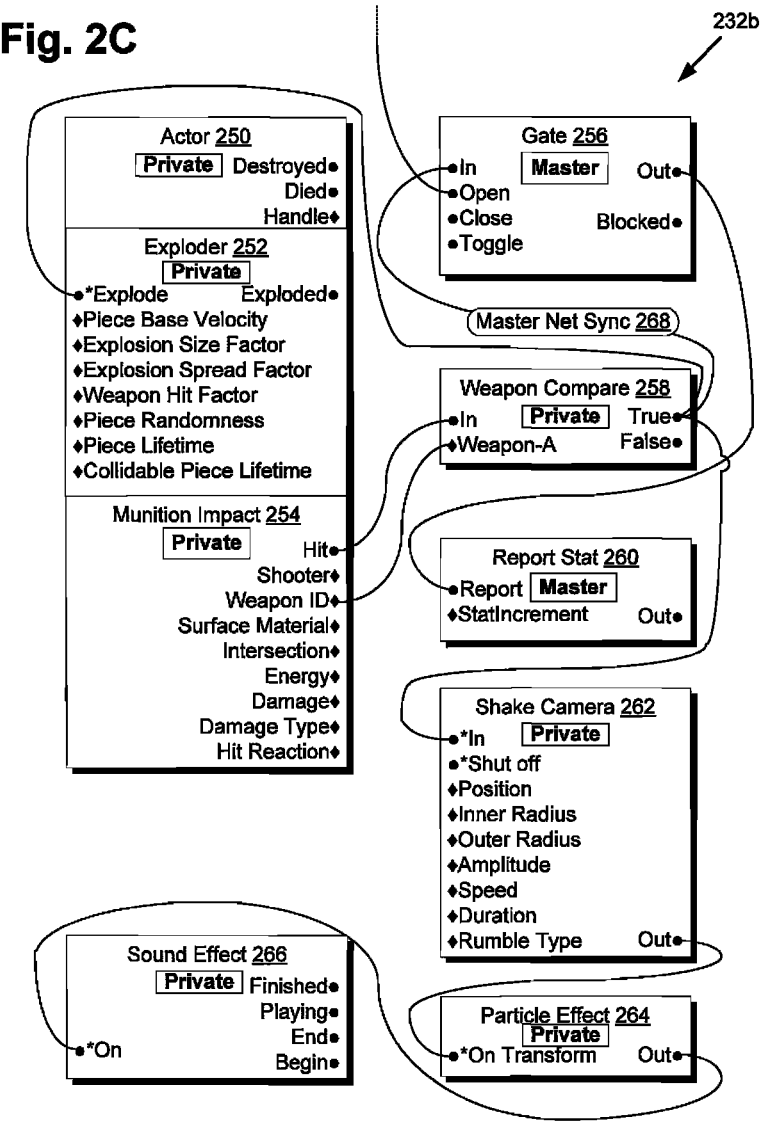
FIG. 2C presents an exemplary diagram of a state graph expressed by a visual script language.

Thus, turning to FIG. 2C, FIG. 2C presents an exemplary diagram of a state graph expressed by a visual script language. With respect to FIG. 2C, like numbers may correspond to like elements from FIG. 2A. FIG. 2C also includes an additional node not present in FIG. 2A, master net sync 268.

As shown in FIG. 2C, graph 232*b* is modified from graph 232*a* such that munition impact 254 is set to "private" rather than the default "master". Additionally, master net sync 268 is inserted prior to gate 256, the output impulses from gate 256 to exploder 252 and report stat 260 are transferred to weapon compare 258, and the output impulse from report stat 260 to shake camera 262 is transferred to weapon compare 258. Accordingly, gate 256 and report stat 260 are set to "master", whereas all other nodes are set to "private".

Since the kick-off node or munition impact 254 is set to "private", client 110*a* can take control and proceed to process its own copy of graph 232*b* within private graphs 118*a*, rather than immediately sending a kick-off stream to a server. Thus, client 110*a* can process graph 232*b* and generate a private decision stream, at least for those nodes that are set to "private". Accordingly, munition impact 254, weapon compare 258, exploder 252, shake camera 262, particle effect 264, and sound effect 266 can all be processed and evaluated on client 110*a* without consulting or synchronizing with any outside clients or servers.

The resulting decision stream is shown as private decision stream 234*a* of FIG. 2D, which presents an exemplary diagram of decision streams for synchronizing the state graph of FIG. 2C between networked computers. As shown in private decision stream 234*a*, client 110*a* only records entries 236*d* and 236*e* for munition impact 254 and exploder 252, similar to the processing of graph 232*a* by server 110*a* as discussed above. However, once processing on all private nodes is completed, nodes beyond master net sync 268 must be processed on server 120*a*, as these downstream nodes are set to "master" requiring global synchronization.

Accordingly, prior to handing processing control to server 110*a*, private decision stream 234*a* may be sent to server 120*a*, which may be used to synchronize master graphs 128*a*. To synchronize the private graphs on the remaining clients, server 120*a* may distribute private decision stream 234*a* to the other clients in the same game, including client 110*b*, so that all clients can carry out the same actions as indicated in private decision stream 234*a*. Advantageously, near instantaneous feedback is provided in response to user actions on the client where the kick-off node originated, or client 110*a*, since client 110*a* can process private nodes directly without waiting for a decision stream from an outside source. Thus, the user of client 110a can appreciate immediate visual and audio effects from a user initiated weapon attack. While other clients such as client 110b may render a slightly delayed response since synchronization starts upon receiving private decision stream 234a, the delayed response may be acceptable since the effects are concerning the actions of other users rather than the specific user of the client.

After server 120a distributes private decision stream 234a, server 120a may begin the process of building its own master decision stream 234b for the remaining downstream nodes set to master, or global synchronization. As shown in FIG. 2D, master decision stream 234b includes records 236f, 236g, and 236h. The stream building process may proceed similar to the processing of graph 232a by server 120a, as described above. However, master net sync 268 rather than munition impact 254 triggers the creation of the remote kickoff stream, and only the "Master" nodes of graph 232b are processed. Accordingly, a record 236f for master net sync 268 may be created as shown, which may include any optional input parameters that are necessary for downstream node processing. In the case of graph 232b, since only the "True" output impulse is sent to master net sync 268 from weapon compare 258, no parameters are necessary in the data field of record 236f. Record 236g may be added to record the state of gate 256. Record 236h may be added with an empty data field to simply indicate that the report stat 260 node was processed successfully, as the report stat 260 node may write a record into a database which has its own synchronization facilities.

Server 120a may distribute the completed master decision stream 234b to all relevant clients, including client 110a and 110b, for final synchronization. For record 236g, each client may update in their respective private graphs the state of gate 256 to "open" as indicated in the data field. For record 236h, since the data field is empty, each client may independently query the relevant values from the database used by report stat 260 to calculate total damage inflicted on actor 250. After distributing and processing master decision stream 234b for each client, all processing and network synchronization of graph 232b originating from the munition impact 254 kickoff node is completed. Accordingly, processing of graph 232b is done with reduced latency for high responsiveness to user inputs while maintaining synchronization of important multi-player logic such as accurate distribution of in-game rewards.

Figure 3:
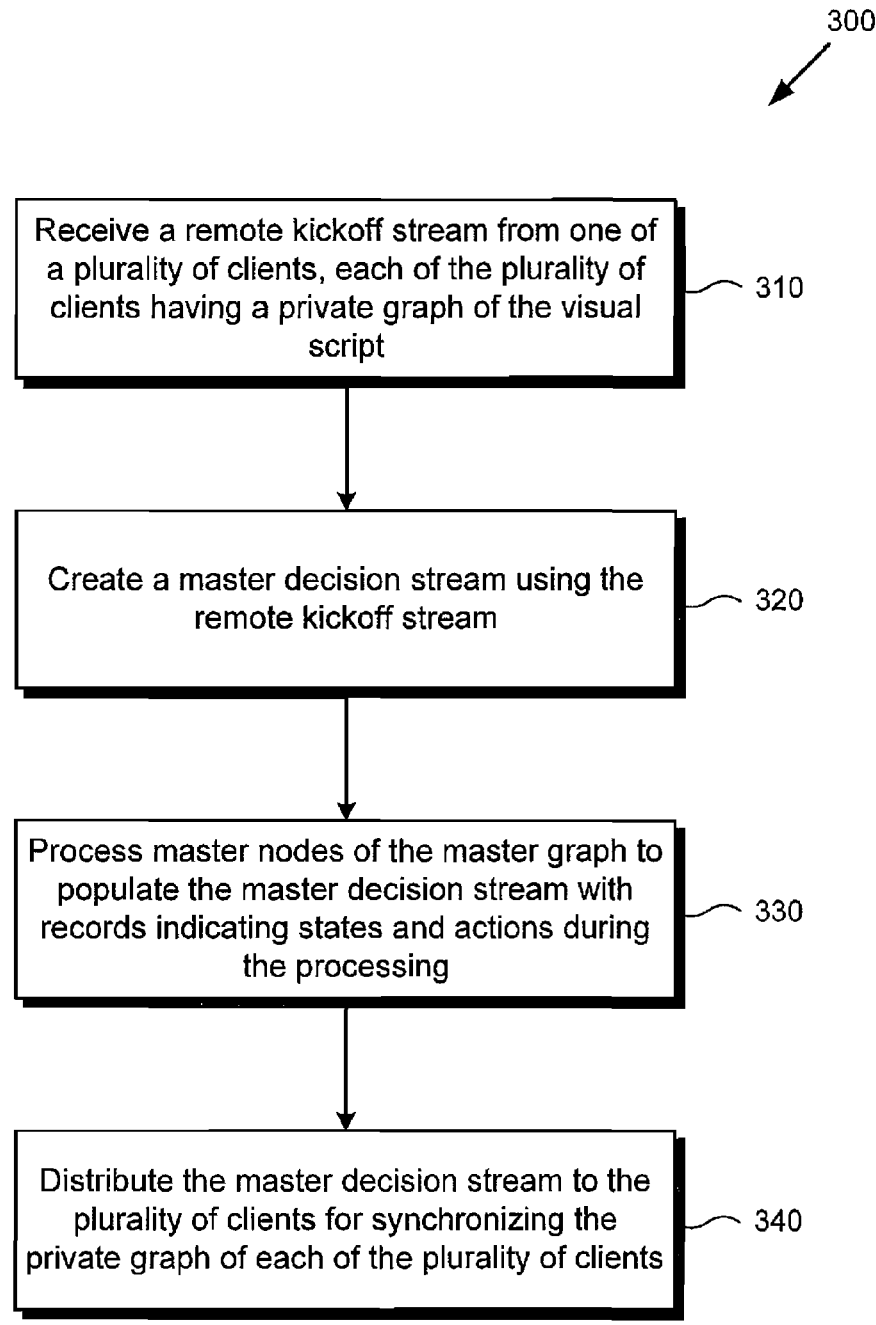
FIG. 3 presents an exemplary flowchart illustrating a method by which decision streams may be provided for synchronizing visual script language processing between networked computers.

FIG. 3 presents an exemplary flowchart illustrating a method by which decision streams may be provided for synchronizing visual script language processing between networked computers. Flowchart 300 begins when processor 122a of server 120a receives, over network 135, a remote kickoff stream from client 110a, where client 110a and client 110b each have a private graph of graph 132 in private graphs 118a and 118b, respectively (block 310). As discussed above, a remote kickoff stream may begin when a kickoff node is triggered on a local or private graph, or when a master net sync node is encountered while processing a private graph. Thus, the remote kickoff stream may contain a record for the details of the kickoff node, similar to record 236a, or a record for the details of the master net sync node, similar to record 236f.

When graph 132 corresponds to graph 232b, where the kick-off node munition impact 254 has additional private nodes connected, a private decision stream may be created at the client where the kick-off node originally triggered, or client 110a. Thus, prior to receiving the remote kickoff stream, processor 122a of server 120a may also receive, synchronize, and distribute private decision stream 234a. More specifically, processor 122a of server 120a may receive private decision stream 234a from client 110a over network 135, synchronize master graphs 128a using private decision stream 234a, and distribute private decision stream 234a to the remaining clients over network 135 to synchronize the other private graphs. In this case, the distributing of private decision stream 234a would only be to client 110b to update private graphs 118b. As previously discussed, a callback function may be registered at each client to handle the receiving of private and master decision streams for synchronizing.

Next, processor 122a of server 120a creates a master decision stream using the remote kickoff stream (block 320). If the remote kickoff stream contains a record similar to record 236a, then the master decision stream may appear similar to decision stream 234 of FIG. 2B, with only record 236a populated. If the remote kickoff stream contains a record similar to record 236f, then the master decision stream may appear similar to master decision stream 234b of FIG. 2D, with only record 236f populated. Accordingly, the creation of the master decision stream may simply copy the records present in the provided remote kickoff stream.

Next, processor 122a of server 120a processes master nodes of the master graph to populate the master decision stream with records indicating states and actions during the processing (block 330). Assuming graph 132 corresponds to graph 232b, processor 122a of server 120a may process those nodes marked as "master" in graph 232b, or gate 256 and remote stat 260. Thus, master decision stream 234b may be populated with records 236g and 236h to indicate the states and actions taken during the processing of gate 256 and report stat 260, respectively.

Next, processor 122a of server 120a distributes the master decision stream to clients 110a and 110b for synchronizing private graphs 118a and 118b (block 340). As previously discussed, a callback function may be registered at each client to receive the master decision stream 234b and update the private graphs, which may be processed in an identical fashion at each respective client. Accordingly, each client is updated using a single authoritative master decision stream 234b.

In addition to providing synchronization between networked computers, the decision streams may also be used as a general purpose networked data distribution system, as any data may be included as records in the decision stream. Thus, for example, decision streams may be utilized to allow new players to join an existing multi-player game session by including records having all of the relevant game states that would require updating on the client of the new player.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:
1. A computing device for providing decision streams for synchronizing visual script language processing between networked computers, the computing device comprising:
   a memory including a game application and a master graph of a visual script, wherein the master graph includes a plurality of nodes, each of the plurality of nodes having a synchronization setting being set to private or master;

a processor configured to execute the game application to:

receive a remote kickoff stream from one of a plurality of clients, each of the plurality of clients having a private graph of the visual script, wherein the private graph specifies an in-game location of a corresponding client of the plurality of clients, and wherein the remote kickoff stream contains data regarding a specific triggered event and is generated for processing the specific triggered event;

create a master decision stream using the remote kickoff stream, wherein the master decision stream is created for utilization by the plurality of clients to synchronize with each other;

process master nodes of the master graph to populate the master decision stream with records indicating states and actions during the processing, wherein the master nodes are specified as requiring global synchronization and utilization by the plurality of clients to enforce synchronization by overriding the private graph of the corresponding client of the plurality of clients;

process a private net sync node of the master graph, wherein the private net sync node sets the synchronization setting for one or more of the plurality of nodes to be private to specify that the one or more nodes do not require synchronization, and wherein the processing of the private net sync node mirrors a processing performed by at least one of the plurality of clients without consulting or synchronizing with other one or more of the plurality of clients;

finalize, in response to processing the private net sync node, the master decision stream; and distribute, after finalizing, the master decision stream to the plurality of clients for synchronizing the private graph of each of the plurality of clients in response to processing the private net sync node of the master graph, wherein the master graph is for global synchronization of the private graphs of the plurality of clients.

2. The computing device of claim 1, wherein the remote kickoff stream contains a record for a kick-off node.

3. The computing device of claim 1, wherein the remote kickoff stream contains a record for a master net sync node.

4. The computing device of claim 1, wherein prior to receiving the remote kickoff stream, the processor is further configured to:

receive a private decision stream from the one of the plurality of clients;

synchronize the master graph using the private decision stream; and distribute the private decision stream to the plurality of clients for synchronizing the private graph of each of the plurality of clients.

5. The computing device of claim 1, wherein the visual script is editable using a visual script language creation tool allowing scripting of game logic using a graphical user interface (GUI).

6. The computing device of claim 1, wherein the visual script is retrieved from a script database based on the in-game location of a corresponding client of the plurality of clients.

7. The computing device of claim 1, wherein the distributing of the master decision stream is received by a callback function registered at each of the plurality of clients.

8. A method for use by a game server for providing decision streams for synchronizing visual script language processing between networked computers, the method comprising:

receiving, by the game server, a remote kickoff stream from one of a plurality of clients, each of the plurality of clients having a private graph of a visual script, wherein the private graph specifies an in-game location of a corresponding client of the plurality of clients, and wherein the remote kickoff stream contains data regarding a specific triggered event and is generated for processing the specific triggered event;

creating, by the game server, a master decision stream using the remote kickoff stream, wherein the master decision stream is created for utilization by the plurality of clients to synchronize with each other;

processing, by the game server, master nodes of a master graph of the visual script to populate the master decision stream with records indicating states and actions during the processing, wherein the master graph includes a plurality of nodes, each of the plurality of nodes having a synchronization setting being set to private or master, wherein the master nodes are specified as requiring global synchronization and utilization by the plurality of clients to enforce synchronization by overriding the private graph of the corresponding client of the plurality of clients;

processing, by the game server, a private net sync node of the master graph, wherein the private net sync node sets the synchronization setting for one or more of the plurality of nodes to be private to specify that the one or more nodes do not require synchronization, and wherein the processing of the private net sync node mirrors a processing performed by at least one of the plurality of clients without consulting or synchronizing with other one or more of the plurality of clients;

finalizing, by the game server, in response to the processing of the private net sync node, the master decision stream, wherein the private net sync node sets the synchronization setting for one or more of the plurality of nodes to be private; and distributing, by the game server, after the finalizing, the master decision stream to the plurality of clients for synchronizing the private graph of each of the plurality of clients in response to the processing of the private net sync node of the master graph, wherein the master graph is for global synchronization of the private graphs of the plurality of clients.

9. The method of claim 8, wherein the remote kickoff stream contains a record for a kick-off node.

10. The method of claim 8, wherein the remote kickoff stream contains a record for a master net sync node.

11. The method of claim 8 further comprising, prior to receiving the remote kickoff stream:

receiving a private decision stream from the one of the plurality of clients;

synchronizing the master graph using the private decision stream; and distributing the private decision stream to the plurality of clients for synchronizing the private graph of each of the plurality of clients.

12. The method of claim 8, wherein the visual script is editable using a visual script language creation tool allowing scripting of game logic using a graphical user interface (GUI).

13. The method of claim 8, wherein the visual script is retrieved from a script database based on the in-game location of a corresponding client of the plurality of clients.

14. The method of claim 8, wherein the distributing of the master decision stream is received by a callback function registered at each of the plurality of clients.

15. A system for providing decision streams for synchronizing visual script language processing between networked computers, the system comprising:
   a plurality of clients each having a private graph of a visual script, wherein the private graph specifies an in-game location of a corresponding client of the plurality of clients, and wherein the remote kickoff stream contains data regarding a specific triggered event and is generated for processing the specific triggered event;
   a network;
   a master computing device comprising:
      a memory including a game application and a master graph of the visual script, wherein the master graph includes a plurality of nodes, each of the plurality of nodes having a synchronization setting being set to private or master;
      a processor configured to execute the game application to:
         receive, over the network, a remote kickoff stream from one of the plurality of clients;
         create a master decision stream using the remote kickoff stream, wherein the master decision stream is created for utilization by the plurality of clients to synchronize with each other;
         process master nodes of the master graph to populate the master decision stream with records indicating states and actions during the processing, wherein the master nodes are specified as requiring global synchronization and utilization by the plurality of clients to enforce synchronization by overriding the private graph of the corresponding client of the plurality of clients;
         process a private net sync node of the master graph, wherein the private net sync node sets the synchronization setting for one or more of the plurality of nodes to be private to specify that the one or more nodes do not require synchronization, and wherein the processing of the private net sync node mirrors a processing performed by at least one of the plurality of clients without consulting or synchronizing with other one or more of the plurality of clients;
         finalize, in response to processing the private net sync node, the master decision stream; and
         distribute, after finalizing, over the network, the master decision stream to the plurality of clients for synchronizing the private graph of each of the plurality of clients in response to processing the private net sync node of the master graph, wherein the master graph is for global synchronization of the private graphs of the plurality of clients.

16. The system of claim 15, wherein the remote kickoff stream contains a record for a kick-off node.

17. The system of claim 15, wherein the remote kickoff stream contains a record for a master net sync node.

18. The system of claim 15, wherein prior to receiving the remote kickoff stream, the processor is further configured to:
   receive, over the network, a private decision stream from the one of the plurality of clients;
   synchronize the master graph using the private decision stream; and
   distribute, over the network, the private decision stream to the plurality of clients for synchronizing the private graph of each of the plurality of clients.

19. The system of claim 15, wherein the visual script is editable using a visual script language creation tool allowing scripting of game logic using a graphical user interface (GUI).

20. The system of claim 15, wherein the visual script is retrieved from a script database based on the in-game location of a corresponding client of the plurality of clients.

* * * * *